3,564,091
PROCESS FOR KILLING BACTERIA AND FUNGI WITH ARALKANOL ESTERS OF BORIC ACID AND GLYCOL BORATES

Richard J. Degray, South Euclid, and William O. Fitzgibbons, Hudson, Ohio, assignors to The Standard Oil Company, Cleveland, Ohio, a corporation of Ohio
No Drawing. Filed May 13, 1966, Ser. No. 549,798
Int. Cl. A01n *9/00;* A61l *13/00, 23/00*
U.S. Cl. 424—185            6 Claims

ABSTRACT OF THE DISCLOSURE

Boric acid esters of aralkanols containing 2 to 3 carbon atoms, and esters of said aralkanols with 1–2 or 1–3 glycol monoborates which are easily formed and incorporated into water, hydrocarbon, animal or vegetable oil media, are effective in killing substantially all bacteria and fungi in about half an hour even when present in very low concentrations.

---

This invention relates to the use of certain borate esters for the control of microorganisms in a liquid medium.

More particularly, this invention relates to the use as biocides, compounds selected from the group consisting of (1) esters of boric acid and an alcohol of the formula A—R—OH, wherein A is an aryl hydrocarbon group of 6–14 carbon atoms and R is an aliphatic hydrocarbon group of more than one carbon atom, and (2) A—R—OH alcohol esters of glycol orthoborates wherein A and R are as described above.

In the general formula above, A is preferably selected from the group consisting of phenyl, naphthyl, phenanthracyl, and anthracyl. The glycol is selected from the group consisting of alpha and beta glycols containing 3–20 carbon atoms. The term boric acid embraces ortho-, meta-, and pyroboric acids, and boric oxide.

While the compounds useful in accordance with this invention are known in the art, it has now been discovered that they possess outstanding biocidal properties.

These novel biocides are characterized by their quick action and their effectiveness against both Gram Positive and Gram Negative organisms. The biocidal activity of these compounds described appears to be quite unique, in that analogous compounds such as benzyl borate and 1-phenyl propanol-2 orthoborate are ineffective for this purpose. The following tests were performed using analogous alcohols to show their effectiveness.

PROCEDURE

The compounds were made in situ by adding sufficient boric acid and the requisite alcohol to a 125 ml. Erlenmeyer flask containing 20 mls. mineral salts solution and 25 ml. kerosine. The pH was adjusted to 6.8 as required. After two hours equilibration, the flasks were inoculated with 30 ml. of a 24-hour culture of mixed microbes. The microbes were a mixture from three storage tank water bottoms known to contain those microbes most difficult to control. This gave a final volume of 25 ml. kerosine:50 ml. aqueous.

The flasks were assayed ½ hour, 1 day, 2 days, 5 days, and 9 days following inoculation.

RESULTS

Table I shows the rate of kill in the aqueous phase of boric acid esters prepared from various analogous alcohols.

TABLE I.—RATE OF KILL OF TRI-ARYL-ALKANOL BORATES AT 0.05% B

| Aryl-alkanol radical | Count (organisms/ml.) | | | | |
|---|---|---|---|---|---|
| | 1/2 hr. | 1 day | 2 days | 5 days | 9 days |
| 3-phenyl-n-propanol-1 | 0 | 0 | 0 | 0 | 0 |
| 2-phenylethanol-1 | 150 | 0 | 0 | 0 | 0 |
| 1-phenylethanol-1 | $40 \times 10^4$ | $10^{8+}$ | 0 | 0 | 0 |
| 1-phenyl-n-propanol-2 | $6 \times 10^6$ | $50 \times 10^4$ | 0 | 0 | 0 |
| Benzyl alcohol | $2.5 \times 10^6$ | $10^{8+}$ | 30 | 0 | 0 |
| $\alpha,\alpha$-Dimethyl-phenylethyl alcohol | $3 \times 10^6$ | $10^{8+}$ | $60 \times 10^4$ | $2 \times 10^2$ | |

It will be seen from the table that the boric acid ester of benzyl alcohol is the least effective of the normal arylalkanols tried, followed by 2-phenethanol-1 and finally the most effective, 3-phenyl-n-propanol-1. The alcohol with the branched side chain is even less effective than the borate of benzyl alcohol.

The effectiveness of aryl-alkanol borates depends on the presence of (1) a terminal hydroxyl, (2) a normal alkyl chain, and (3) the aromatic ring being omega to the hydroxyl. The omega positioning indicates that the aromatic ring and hydroxyl radical are terminally bonded to opposite ends of the alkyl chain.

Table II shows the rate of kill of boric acid esters prepared from various aromatic alcohols.

TABLE II.—RATE OF KILL OF TRI-ARYL BORATES AT 0.05% B

| Aromatic Alcohol | Count (organisms/ml.) | | | | |
|---|---|---|---|---|---|
| | ½ hr. | 1 day | 2 days | 5 days | 9 days |
| $\alpha$-Naphthol | 0 | 0 | 0 | 0 | 0 |
| o-Cresol | 0 | 0 | 0 | 0 | 0 |
| p-Chlorophenol | 0 | 0 | 0 | 0 | 0 |
| p-Phenyl phenol | $2 \times 10^6$ | $10^{8+}$ | $10^{8+}$ | $10^{8+}$ | $10^{8+}$ |
| p-Cyclohexyl phenol | $5 \times 10^6$ | $10^{8+}$ | $10^{8+}$ | $10^{8+}$ | $10^{8+}$ |
| p-t-Butyl phenol | $10^{8+}$ | $2 \times 10^4$ | $50 \times 10^2$ | $4 \times 10^4$ | |

Tri-$\alpha$-naphthol borate, tri-o-cresyl borate, and tri-p-chlorophenol borate all killed within a ½ hour. The phenolic moieties of these three borates are quite toxic in themselves. Subsequent experiments showed that the triaryl borates were no more effective than the parent aromatic alcohols. The boric acid esters of p-phenyl phenol, p-cyclohexyl phenol and p-t-butyl phenol are shown to be ineffective.

A disadvantage of glycol borates as biocides, as compared with other germicides, is the time required to completely eliminate the bacterial population in a medium. Under ideal conditions, complete control of a mixed culture requires at least 24 hours. This slow response is a serious drawback in many applications and the need for a quick-acting modification containing all of the virtues of the glycol borates has been indicated. The borates described in this invention were found to fill these requirements giving complete kill of even the most resistant microbes in 30 minutes.

As a matter of definition, all bacteria may be classified as either Gram Positive or Gram Negative. This property is determined by treating a sample with a crystal violet solution followed by a solution of iodine in aqueous potassium iodide. All of the bacterial cells are stained by this procedure, but treatment with 95% ethanol removes the stain from some organisms and not from others. Those which retain the stain are designated Gram Positive, and those which do not are considered Gram Negative. The retention of the crystal violet-iodine or the lack of it relates to the nature of the cell wall. Gram Positive organisms are surrounded by walls which contain predominantly polysaccharides, and are therefore hydrophilic. Gram Negative bacterial organisms have walls which contain fatty substances and are essentially hydrophobic. Some cell walls are intermediate in this respect and contain both saccharides and fatty materials.

The 2-phenyl ethyl alcohol is known to be one of the few chemicals which suppresses only Gram Negative organisms. Glycol borates are effective against all types of bacteria (Gram Positive and Gram Negative) including fungi and yeasts but require as long as 21 days for complete sterilization. However, the virtues of both of the above compounds are combined in the mono-, di- and tri-phenyl alkyl borates and in the phenyl alkanol esters of glycol borates. In a liquid medium, compounds of this invention destroy both Gram Positive and Gram Negative organisms within 30 minutes at concentrations as low as 0.05% boron. Concentrations of 0.01% boron are also effective to a degree. The upper limit on the concentration is determined by economic considerations. Though the tri-ester contains three times as much phenyl ethyl alcohol as does the mono-ester, for a given boron concentration, the effectiveness is equivalent.

Tests have shown that while microbes in a two-phase hydrophilic-hydrophobic system are concentrated at the interface, bacteria live in both phases. The effectiveness of the compounds of this invention in a two-phase system is dependent upon the ability of these esters to solubilize to some degree in the hydrophobic phase and to be capable of undergoing limited extraction from the hydrophobic phase into the hydrophilic phase. The solubility of the esters in the hydrophobic phase increases with the number of phenethanol groups in the compound and the number of carbons in the glycol. Though the mono-ester is insoluble in hydrocarbon, it can be administered in a mutual solvent for hydrocarbon and water such as an alcohol, glycol, glycerine, etc. The di-ester is intermediate in solubility while the tri-ester is very soluble in hydrocarbon and can be administered in peanut oil, or other carriers to solubilize it in the water phase. Thus, with the use of solvents appropriate to the application, excellent control of all bacteria and fungi can be readily obtained.

The concentration of biocide required for essentially complete sterilization will vary with a number of factors including the nature of the medium. Generally, concentrations in the hydrophobic phase that will give concentrations in the hydrophilic phase of from 0.05 to 0.2 weight percent boron are preferred.

PREPARATION OF ESTERS

The borates of 2-phenyl alkanol can readily be prepared by heating the alcohol in boric acid in the desired ratio for the mono-, di- or tri-ester and removing the water of the reaction azeotropically. The esters can also be readily prepared in situ. Benzene, toluene or xylene may be used as the azeotroping solvent. In preparing the glycol borate esters, the proper ratios of glycol, alcohol and boric acid may be mixed with one of the aforementioned aromatic solvents and the water removed azeotropically, or the glycol borate may be formed by conventional means and the alcohol reacted with the product. The water of the reaction may also be removed by simple distillation using a non-azeotroping solvent such as iso-octane. An example of a typical preparation is given below.

PREPARATION OF MONO-ESTER 12.21 grams of 2-phenyl ethyl alcohol (0.1 mole) were mixed with 6.18 grams of boric acid (0.1 mole). 15 mls. of iso-octane were added and the mixture was stirred and heated for 40 minutes. During this time, 1.8 mls. of water of reaction (0.1 mole) were collected in a Dean and Stark trap. The product, a milky suspension of mono-phenyl ethyl borate, was soluble in water, acetone and dioxane but sparingly soluble in toluene. The same procedure was used in the preparation of the di- and the tri-phenyl ethyl borates.

PREPARATION OF DI-ESTER 24.42 grams phenyl ethyl alcohol, 6.18 grams of boric acid and 50 mls. of iso-octane were reacted in a flask in the above manner and 2.6 mls. of water were removed by azeotropic distillation. 56 grams of product were obtained.

PREPARATION OF TRI-ESTER 36.6 grams of phenyl ethyl alcohol, 6.18 grams of boric acid and 50 mls. of iso-octane were reacted and 4.5 mls. of water were removed azeotropically. 47 grams of product were obtained.

PREPARATION OF 2-ETHYL, 2-BUTYL, PROPANEDIOL-1,3-BORATE ESTER 320 grams of 2-ethyl, 2-butyl propanediol-1,3, 100 mls. of toluene and 123.6 grams of boric acid were reacted and 72 mls. of water were removed azeotropically. 244 grams of phenyl ethyl alcohol were added to the product and 36 grams of water were again removed. After evaporation under vacuum, 602 grams of product remained.

PREPARATION OF HEXYLENE GLYCOL BORATE ESTER

Similarly, 12.21 grams of 2-phenyl ethyl alcohol, 14.4 grams of hexylene glycol orthoborate (0.1 mole) and 50 mls. of iso-octane were azeotropically distilled for 45 minutes. Again 1.8 mls. of water of reaction were collected. The product gave a clear, colorless solution in toluene.

The phenyl-propanol esters of boric acid are prepared by simply adding the two substances to a flask and permitting the reaction to proceed of its own volition. Temperature of the reactions may vary from 0° C. to the boiling point of the alcohol.

MICROBIOLOGICAL TESTING

(I) Hydrocarbon-water system

Fifty mls. of commercial turbine fuel, somewhat less than 20 mls. of water and sufficient biocide to give a boron concentration in the water of 0.05 to 0.20% were placed in a flask. The pH of the aqueous phase was adjusted to 6.5 with 0.1 normal sodium hydroxide, and the volume of this phase was adjusted to 20 mls. Thirty mls. of an aqueous, 24-hour mixed inoculum were added to this system and the pH was rechecked. The inoculum contained a mixture of organisms, including fungi. The flasks were placed on a gyrorotatory shaker. The aqueous phase was sampled one-half hour after the inoculum was added using the dilution technique described below. The flasks were assayed daily for the duration of the tests.

Using three mls. of aqueous sample, one ml. was plated by conventional means with Nutrient Agar, one ml. with Sabouraud's Agar and one ml. was added to a dilution bottle containing 99 mls. of water. The dilution water was an A.P.H.A. buffered dilution water or other (sterile) dilute salts medium. The dilution bottle was shaken 25 times, and a sample (diluted 100 times) was plated with Nutrient Agar and Sabouraud's Agar. A second centade dilution was made and poured in the same manner. This technique was carried out to give plates of Nutrient Agar and Sabouraud's Agar representing dilutions of the original sample of 100, 10,000 and 1,000,000. After the Agar had solidified at room temperature, the Petri dishes were inverted and incubated at 32° C. in the conventional manner. Nutrient Agar encourages bacterial development, and these plates were usually mature enough for counting after 48 hours of incubation. Sabouraud's Agar encourages yeast and fungi. These plates mature more slowly, and 72 or 96 hours of incubation were allowed before counting. A Quebec Colony Counter was used to determine the number of the organisms.

EXPERIMENTAL RESULTS OF HYDROCARBON-AQUEOUS SYSTEMS

The experimental results obtained from the microbiological tests are summarized in Tables III and IV. Table III shows the effectiveness of the mono-, di- and tri-borate esters of 2-phenyl ethanol at 0.025 and 0.05% boron concentrations in the aqueous phase.

TABLE III.—EFFECT OF BORIC ACID ESTERS OF 2-PHENETHANOL-1 ON MICROBIAL POPULATION IN TWO-PHASE SYSTEM

| Ester | Microbial count after— | | | | | | |
|---|---|---|---|---|---|---|---|
|  | 0.5 hr | 7 hrs. | 24 hrs. | 2 days | 3 days | 4 days | 8 days |
| Additive concentration=0.05% B in aqueous phase: | | | | | | | |
| Mono-ester | 60 | 0 | 0 | | | | |
| Di-ester | $4 \times 10^4$ | 110 | 0 | | | | |
| Tri-ester | 90 | 0 | 0 | | | | |
| Additive contration=0.025% B in aqueous phase: | | | | | | | |
| Mono-ester | TNTC | TNTC | TNTC | TNTC | TNTC | TNTC | TNTC |
| Di-ester | TNTC | TNTC | 180 | 130 | 160 | $90 \times 10^2$ | TNTC |
| Tri-ester | TNTC | TNTC | 140 | 0 | 40 | 20 | $200 \times 10^4$ |

NOTE.—TNTC=to numerous to count.

The data show that at 0.025% boron concentration, the effectiveness of the ester increases as the number of phenyl ethanol groups increases from 1 to 3. However, at 0.05% boron concentration, there is little difference between these three esters. These data therefore suggest that the presence of boron increases the effectiveness of the compound as a microbicide. This can be readily observed by comparing the effect of the di-phenyl ethanol ester at 0.025 weight percent boron and the mono-phenyl ethanol ester at 0.05 weight percent boron where the concentration of the phenyl ethanol is the same. At the higher boron concentration, the compound is more effective.

Gram stain tests done at the end of the experiments showed that survivors of the mono-ester were predominantly Gram Negative while those of the tri-ester were Gram Positive. The di-ester was effective against both Gram Positive and Gram Negative organisms.

Table IV shows the improvement in biocidal activity by reacting 2-phenethanol-1 with hexylene glycol borate and with 2-ethyl, 2-butyl propane diol borate.

TABLE IV.—EFFECT OF 2-PHENETHANOL ESTERS OF GLYCOL BORATES ON MICROBIAL POPULATION IN TWO-PHASE SYSTEM

| Ester concentration | Time (hours) | Microbial count |
|---|---|---|
| 0.20% Boron as phenethanol ester of hexylene glycol borate | 0.5 | 0 |
|  | 7 | 0 |
| 0.10% Boron as phenethanol ester of hexylene glycol borate | 0.5 | 200 |
|  | 7 | 52 |
|  | 24 | 0 |
| 0.05% Boron as phenethanol ester of 2-ethyl, 2-butyl propanediol borate | 0.5 | 60 |
|  | 7 | 0 |
|  | 24 | 0 |
|  | 15 | TNTC |
| 0.2% Boron as hexylene glycol borate | 16 | $32 \times 10^4$ |
|  | 17 | $720 \times 10^2$ |
| 0.05% Boron as 2-ethyl, 2-butyl propanediol borate | 0.5 | $52 \times 10^2$ |
|  | 7 | 160 |
|  | 24 | 0 |

[1] Days.
NOTE.—TNTC=Too numerous to count.

The data show that 0.05% boron in the aqueous phase was required for the 2-ethyl, 2-butyl propane diol borate to eliminate the bacterial life in one day. The addition of the 2-phenyl ethanol to this borate resulted in sterile conditions within one-half hour. With 0.20% boron as hexylene glycol borate, 14 days were required to render the aqueous phase sterile at this concentration. However, the phenyl ethanol ester of hexylene glycol borate was completely effective in one-half hour. In this same experiment, the organisms were controlled but were not killed by 0.10% boron as hexylene glycol borate in the aqueous phase. At this concentration, the hexylene glycol borate served as a bacteriostat rather than a biocide. The phenyl ethanol ester of hexylene glycol borate at this same boron concentration sterilized the aqueous phase within 24 hours.

(II) Aqueous systems

A mixed culture was added to 25 mls. of a 1% peptone solution and incubated with shaking for 24 hours. Very heavy growth was evidenced by the turbidity and odor. The test compound was then added. After five days, 0.1 ml. was removed and plated to determine whether any viable organisms survived. The two compounds used were tri-2-phenyl ethyl borate and the 2-phenyl ethyl ester of 2-ethyl - 2-butyl-propanediol - 1,3-borate. The percent boron is calculated simply on the basis of the 25 mls. aqueous phase. No hydrocarbon phase was present. The results are tabulated in Table V.

TABLE V

| Compound | Percent B | Growth |
|---|---|---|
| Control | | + |
| Tri-2-phenyl ethyl borate | .05 | − |
| Do | .10 | − |
| Do | .20 | − |
| Do | .40 | − |
| 2-Phenyl ethyl ester of 2-ethyl-2-butyl-propanediol-1,3 borate | .05 | − |
| Do | .10 | − |
| Do | .20 | − |
| Do | .40 | − |

Both compounds killed at .05% boron in the strictly aqueous system, while the control with no biocides was still very much alive. This is unexpected. The glycol borates require the presence of a hydrocarbon overlay in order to be effective. These substituted compounds do not require the hydrocarbon overlay and are operable in strictly aqueous systems.

(III) Lipoidal systems

The addition of a biocide to an animal or vegetable oil would impart biocidal advantages to the material. These advantages would be useful in the preparation of biostatic and biocidal ointments and dressings.

The requisite amount of the boron compounds was dissolved in 10 mls. of the oil. The oils were neat's-foot, corn (Mazola), cottonseed (USP), and Crisco. The Crisco was melted in order to dissolve the additive. On cooling, the tubes were rotated so that the oil coated the walls of the tube. Two compounds, tri-2-phenyl ethyl borate and 2-phenyl ethyl ester of 2-ethyl-2-butyl propanediol-1,3 borate, were used at .0125%, .025%, .05% and .10% boron in the oil. The inoculum consisted of 2.5 mls. of a 24-hour culture grown in 1% peptone. The tubes were assayed after five days by pour plate techniques. Growth was measured on the basis of:

0 = no growth
± = less than 100 colonies
+ = more than 100 colonies

The results are tabulated in Table VI.

TABLE VI

| | Oil | | | |
|---|---|---|---|---|
| | Neat's-foot | Corn | Cotton-seed | Crisco |
| Percent B: Tri-2-phenyl ethyl borate | | | | |
| 0 | + | + | + | + |
| .0125 | + | + | + | + |
| .025 | − | + | + | + |
| .05 | − | + | + | + |
| .10 | − | − | − | − |
| Percent B: 2-phenyl ethyl ester of 2-ethyl-2-butyl propanediol-1,3 borate | | | | |
| 0 | + | + | + | + |
| .0125 | + | + | + | + |
| .025 | ± | + | + | + |
| .05 | − | + | + | + |
| .10 | − | − | ± | − |

The kill was best in neat's-foot oil. Corn oil and Crisco seem equivalent in that .05% B did not kill, but .10% B achieved control. Cottonseed oil containing .10% B as tri-phenyl-ethyl borate controlled while the phenyl ethyl ester of the glycol borate required slightly more. The ± at the .10% B level indicates that this concentration is threshold and slightly more additive is necessary in order to control.

The aryl alkanol borate compounds tried herein contained up to a maximum of 3 carbon atoms in the normal alkanol chain. It has been discovered that the effectiveness of these new biocides increases as the length of the normal side chain increases. The reason for not extending investigation to an alkanol chain of greater than three carbon atoms is because such compounds are not presently commercially available. However, once the stated conditions are satisfied, i.e., (1) that OH be on the alpha carbon atom, (2) that the alkyl chain be normal and over one carbon long, and (3) the aromatic ring be in omega position to OH, the effectiveness of such aryl alkanols is limited only by their solubility in the liquid media.

We claim:

1. A process for killing bacteria and fungi in a medium selected from the group consisting of water, hydrocarbon, animal oil and vegetable oil in about half an hour, comprising contacting said bacteria and fungi with a biocidal amount of an ester containing from 0.01 to about 0.4 percent boron concentration said ester being selected from the group consisting of
   (1) an ester formed by the reaction of boric acid and an alcohol having the formula A—R—OH, wherein A is an unsubstituted aryl group of 6 to 14 carbon atoms, R is an alkylene group containing from 2 to 3 carbon atoms, and said reaction is carried out on the basis of 0.1 mole of said boric acid to from about 0.1 to about 0.3 moles of said alcohol at a temperature in the range from 0° C. to about the boiling point of said alcohol; and
   (2) an ester formed by the reaction of a 1–2 or a 1–3 glycol orthoborate containing from 3 to 20 carbon atoms and an alcohol having the formula A—R—OH, wherein A and R are as defined above, said reaction is carried out on the basis of 0.1 mole of said glycol orthoborate to about 0.1 mole of said alcohol at a temperature in the range from 0° C. to about the boiling point of said alcohol.

2. Process of claim 1 wherein said A is phenyl.

3. Process of claim 1 wherein said A is selected from the group consisting of naphthyl, anthracyl, and phenanthracyl.

4. The process of claim 1 wherein the ester contains at least about 0.05% boron and above.

5. The process of claim 1 wherein said ester of group (1) is selected from the group consisting of mono-, di- and tri-esters.

6. The process of claim 5 wherein the ester contains at least about 0.01–0.20% boron.

References Cited

UNITED STATES PATENTS

| 2,260,336 | 10/1941 | Prescott et al. | |
| 2,839,564 | 6/1958 | Garner. | |
| 2,904,578 | 9/1959 | Brust | 260—462 |
| 2,940,839 | 6/1960 | Garner. | |
| 3,161,668 | 12/1964 | Bengelsdorf | 260—462 |
| 3,189,637 | 6/1965 | Bengelsdorf et al. | 167—30X |
| 3,347,646 | 10/1967 | De Gray et al. | 44—76 |

FOREIGN PATENTS

| 722,538 | 1/1955 | Great Britain. |
| 789,444 | 1/1958 | Great Britain. |

OTHER REFERENCES

Merck Index, 1960, 7th Edition, pp. 792–793.

ALBERT T. MEYERS, Primary Examiner
D. R. ORE, Assistant Examiner

U.S. Cl. X.R.

44—76